United States Patent [19]

Ohta et al.

[11] Patent Number: 5,446,779
[45] Date of Patent: Aug. 29, 1995

[54] CASSETTE

[75] Inventors: Yasunori Ohta; Syouichi Kosemura, both of Kanagawa, Japan

[73] Assignee: Fuji Photo Film Co., Ltd., Kanagawa, Japan

[21] Appl. No.: 283,149

[22] Filed: Aug. 1, 1994

Related U.S. Application Data

[63] Continuation-in-part of Ser. No. 59,366, May 12, 1993, abandoned.

[30] Foreign Application Priority Data

May 12, 1992 [JP] Japan .................. 4-119006

[51] Int. Cl.6 .............................. G03B 42/04
[52] U.S. Cl. ..................... 378/182; 378/187
[58] Field of Search .......... 378/167, 169, 182, 185, 378/187, 188

[56] References Cited

U.S. PATENT DOCUMENTS

| | | | |
|---|---|---|---|
| 3,631,243 | 12/1971 | Byler et al. | 378/182 X |
| 3,675,014 | 7/1972 | Perl | 378/182 X |
| 3,848,133 | 11/1974 | Blanc et al. | 378/171 X |
| 4,258,264 | 3/1981 | Kotera et al. | |
| 4,681,227 | 7/1987 | Tamura et al. | 378/182 X |
| 4,987,308 | 1/1991 | Tamura et al. | |

FOREIGN PATENT DOCUMENTS 56-11395  2/1981  Japan .

*Primary Examiner*—David P. Porta
*Attorney, Agent, or Firm*—Sughrue, Mion, Zinn, Macpeak & Seas

[57] ABSTRACT

A cassette houses therein a sheet-shaped radiation image recording medium such that the sheet-shaped radiation image recording medium is capable of being taken out therefrom. A nonwoven fabric is adhered to an inner surface of a flat plate-like portion of the cassette, which portion stands facing an image recording layer of the sheet-shaped radiation image recording medium. The image recording layer is thus prevented from being scratched by dust occurring from a cushioning material or entering the cassette from the exterior. Operations for feeding the sheet-shaped image recording medium into and out of the cassette are not obstructed due to fluctuations in the coefficient of friction of a cushioning material or due to a high coefficient of friction of the cushioning material.

8 Claims, 4 Drawing Sheets

F I G. 3
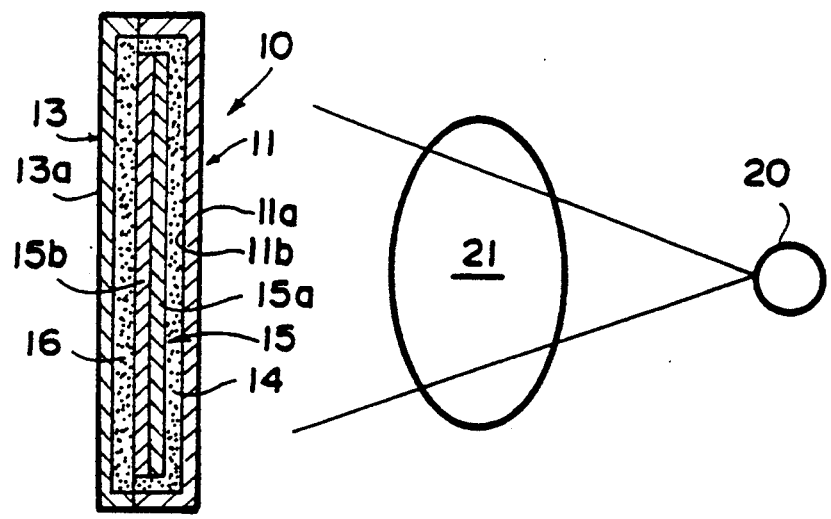
F I G. 4
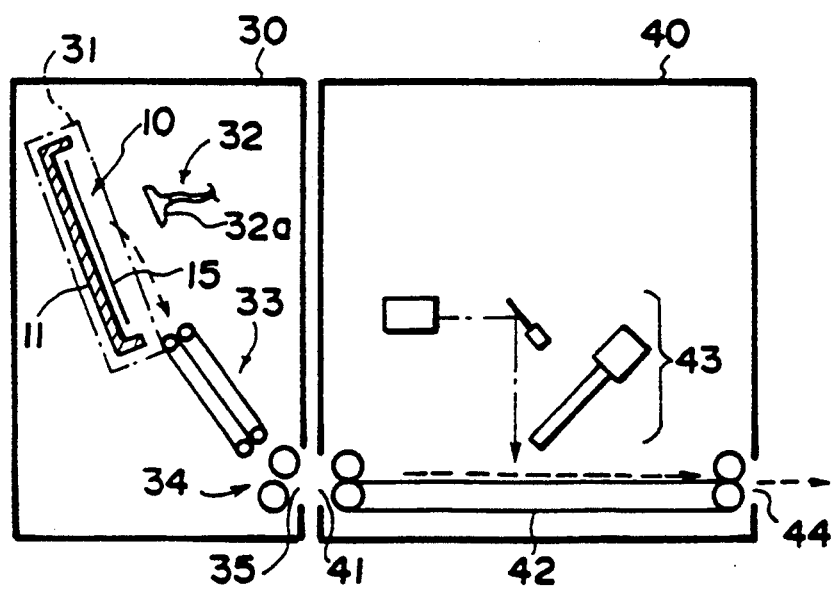

CASSETTE

This is a continuation-in-part of application Ser. No. 08/059,366 filed May 12, 1993 now abandoned.

BACKGROUND OF THE INVENTION

1. Field of the Invention

This invention relates to a cassette for housing therein a sheet-shaped radiation image recording medium, such as X-ray photographic film or a stimulable phosphor sheet, such that the sheet-shaped radiation image recording medium is capable of being taken out therefrom.

2. Description of the Prior Art

X-ray photographic film has heretofore been known as a recording medium, on which a radiation image of an object, such as a human body, is recorded. Also, as a recording medium used for the same purposes, a sheet provided with a layer of a stimulable phosphor (hereinafter referred to as a stimulable phosphor sheet) has heretofore been known. Such stimulable phosphor sheets are disclosed in, for example, U.S. Pat. No. 4,258,264 and Japanese Unexamined Patent Publication No. 56(1981)-11395. When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

A radiation image of an object is recorded on a stimulable phosphor sheet by, for example, exposing the stimulable phosphor sheet to radiation, which has passed through the object. The stimulable phosphor sheet, on which the radiation image has been stored, is then scanned two-dimensionally with stimulating rays, such as a laser beam, which cause it to emit light in proportion to the amount of energy stored during exposure to the radiation. The light emitted by the stimulable phosphor sheet, upon stimulation thereof, is photoelectrically detected. In this manner, an electric image signal representing the radiation image can be obtained.

By way of example, the stimulable phosphor sheet or the X-ray photographic film described above is housed in a light-tight cassette. Each cassette serves to house a single sheet-shaped image recording medium, such as a stimulable phosphor sheet, therein. In general, the cassette is constituted of a box member provided with an opening, through which a recording medium is to be fed into and out of the box member, at a portion, and a cover member, which opens and closes the opening.

When the cassette is used during an operation for recording a radiation image on the stimulable phosphor sheet, or the like, a sheet-shaped image recording medium is housed in the cassette, and the cassette is located at a position for exposure to, for example, radiation having passed through an object. The sheet-shaped image recording medium, which has been housed in the cassette, is exposed to radiation, and a radiation image is thereby recorded on the sheet-shaped image recording medium. After the radiation image has been recorded on the sheet-shaped image recording medium, the sheet-shaped image recording medium is taken out of the cassette. In cases where the sheet-shaped image recording medium is a stimulable phosphor sheet, the radiation image stored on the stimulable phosphor sheet is read out by exposing the stimulable phosphor sheet to stimulating rays. In cases where the sheet-shaped image recording medium is X-ray photographic film, the radiation image recorded thereon is developed.

As a cassette for housing a sheet-shaped radiation image recording medium therein, a cassette is proposed in, for example, U.S. Pat. No. 4,987,308, wherein a cushioning material constituted of a foamed material is adhered to an inner surface of a flat plate-like portion of the cassette, which portion stands facing an image recording layer of the sheet-shaped radiation image recording medium. (The image recording layer is a stimulable phosphor layer in cases where the sheet-shaped radiation image recording medium is a stimulable phosphor sheet, or is a photosensitive material layer in cases where the sheet-shaped radiation image recording medium is X-ray photographic film.) The foamed material is provided in order to prevent the image recording layer from rubbing against the inner surface of the cassette and from being thereby scratched when the sheet-shaped radiation image recording medium is fed into and out of the cassette.

However, the conventional cassette utilizing a foamed material as the cushioning material has the drawbacks in that the foamed material crumbles and constitutes dust while the cassette is being used repeatedly and in that, if dust enters the cassette somehow, dust will intervene between the foamed material and the image recording layer of the sheet-shaped image recording medium and will scratch the image recording layer. Also, the coefficient of friction of the foamed material varies due to fluctuations in the degree of foaming between production lots or due to whether the foamed material is new or old (i.e. due to the use period). If the coefficient of friction is large, the problem will occur in that, when the sheet-shaped image recording medium slips on the foamed material and is thus fed into and out of the cassette, the resistance to slip on the foamed material becomes large and, therefore, the sheet-shaped image recording medium cannot be smoothly fed into and out of the cassette. The conventional cassette also has the drawbacks in that, even if the frictional resistance does not fluctuate, foamed materials have a comparatively large coefficient of friction and do not always allow the sheet-shaped image recording medium to be smoothly fed into and out of the cassette.

SUMMARY OF THE INVENTION

The primary object of the present invention is to provide a cassette, wherein a cushioning material is prevented from crumbling during repeated use of the cassette, and an image recording layer of a sheet-shaped image recording medium is prevented from being scratched by dust entering the cassette.

Another object of the present invention is to provide a cassette, which is free of the problems in that operations for feeding a sheet-shaped image recording medium into and out of the cassette are obstructed due to fluctuations in the coefficient of friction of a cushioning material or due to a high coefficient of friction of the cushioning material.

The present invention provides a cassette for housing therein a sheet-shaped radiation image recording medium such that the sheet-shaped radiation image recording medium is capable of being taken out therefrom, wherein the improvement comprises the provision of one of a thermal bond and spunlace type nonwoven fabric, which is adhered to an inner surface of a flat plate-like portion of the cassette, said flat plate-like portion facing an image recording layer of the sheet-shaped radiation image recording medium.

The cassette in accordance with the present invention is provided with the nonwoven fabric serving as a cushioning material. The nonwoven fabric has an appropriate level of cushioning effects and is sufficiently soft due to characteristics intrinsic to fabrics. Therefore, the nonwoven fabric has fundamental cushioning functions. Accordingly, with the cassette in accordance with the present invention, the image recording layer of the sheet-shaped image recording medium can be prevented from rubbing against the inner surface of the cassette and being thereby scratched when the sheet-shaped image recording medium is fed into and out of the cassette.

Also, the nonwoven fabric does not easily crumble as compared with a foamed material. Therefore, the cassette in accordance with the present invention eliminates the problems in that the cushioning material crumbles and constitutes dust during the repeated used of the cassette.

Additionally, the nonwoven fabric is a porous member. Even if various kinds of dust somehow enters the cassette, such dust will enter pores of the nonwoven fabric. Therefore, with the cassette in accordance with the present invention, the image recording layer of the sheet-shaped image recording medium can be prevented from being scratched by such dust entering the cassette.

Further, the nonwoven fabric is free of factors for fluctuations in the frictional resistance, such as fluctuations in the degree of foaming. Therefore, the nonwoven fabric has little fluctuation in the frictional resistance. Also, in general, the nonwoven fabric has a sufficiently lower frictional resistance than foamed materials. Accordingly, with the cassette in accordance with the present invention, the problem can be prevented from occurring in that, in cases where the sheet-shaped image recording medium slips on the cushioning material and is thus fed into and out of the cassette, the sheet-shaped image recording medium cannot be smoothly fed into and out of the cassette due to a high resistance to slip on the cushioning material.

BRIEF DESCRIPTION OF THE DRAWINGS

FIG. 3 is a schematic view showing how the embodiment of FIG. 1 is used during an operation for recording a radiation image, FIG. 4 is a schematic view showing how the embodiment of FIG. 1 is used during an operation for reading out a radiation image.

DESCRIPTION OF THE PREFERRED EMBODIMENTS

The present invention will hereinbelow be described in further detail with reference to the accompanying drawings.

In the embodiments described below, a stimulable phosphor sheet is housed in the cassette in accordance with the present invention.

Figure 1:
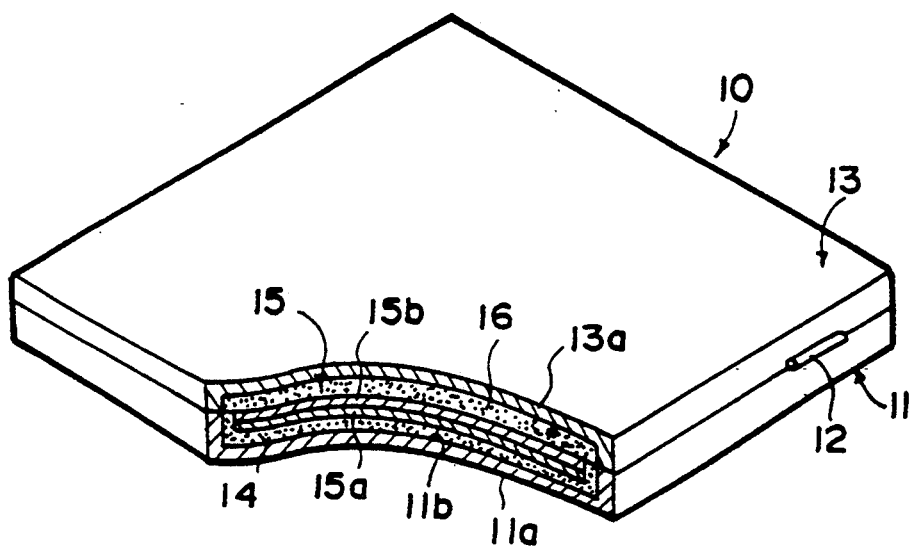
FIG. 1 is a partially cutaway perspective view showing an embodiment of the cassette in accordance with the present invention.

With reference to FIG. 1, a cassette 10 comprises a flat box member 11, and a cover member 13, which is mounted on the box member 11 by a hinge 12 and which covers the box member 11 such that the cover member 13 can be opened and closed. A latch means (not shown) for coupling the box member 11 and the cover member 13 with each other is located on the side face opposite to the side face provided with the hinge 12.

Figure 2:
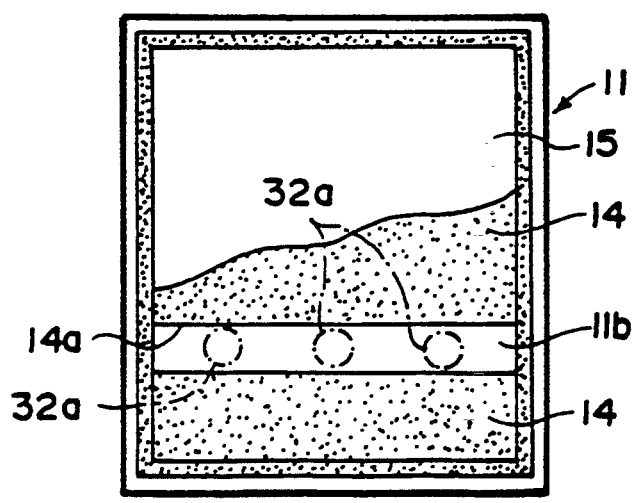
FIG. 2 is a partially cutaway plan view showing part of the embodiment of FIG. 1.

A nonwoven fabric 14 is adhered to an inner surface 11b of a flat plate-like portion 11a of the box member 11. As illustrated in FIG. 2, the nonwoven fabric 14 is provided with a cutaway portion 14a, at which a part of the inner surface 11b of the flat plate-like portion 11a is laid bare. In FIG. 2, circles drawn with the imaginary chained line indicate the positions of suction cups 32a, 32a, 32a of a sheet take-out suction arm, which will be described later.

A stimulable phosphor sheet 15 comprises a substrate 15b and a stimulable phosphor layer 15a overlaid upon the substrate 15b. The stimulable phosphor sheet 15 is housed in the cassette 10 such that the stimulable phosphor layer 15a serving as an image recording layer may stand facing the flat plate-like portion 11a of the box member 11 of the cassette. Specifically, the stimulable phosphor sheet 15 is housed in the cassette 10 such that the stimulable phosphor layer 15a of the stimulable phosphor sheet 15 may come into contact with the nonwoven fabric 14, and such that the substrate 15b may stand facing a flat plate-like portion 13a of the cover member 13. Also, a sponge-like elastic layer 16 for elastically pushing and supporting the stimulable phosphor sheet 15 is adhered to the inner surface of the flat plate-like portion 13a of the cover member 13.

The box member 11 and the cover member 13 of the cassette 10 may be constituted of a metal which has good permeability to radiation, or may be constituted of a hard plastic material. Openable coupling of the box member 11 and the cover member 13 with each other need not necessarily be effected by using a hinge. For example, the box member 11 and the cover member 13 may be separably coupled by a latch, or the like. Also, the elastic layer 16 need not be a sponge-like material. Instead, for example, a rigid plate material may be elastically supported by a flat spring, or the like.

How the cassette 10 having the structure described above works will be described hereinbelow. As illustrated in FIG. 3, when a radiation image is to be recorded on the stimulable phosphor sheet 15 having been housed in the cassette 10, the cassette 10 is located at a position for exposure to a radiation, which has been produced by a radiation source 20, e.g. an X-ray source and has then passed through an object 21. In this state, the stimulable phosphor sheet 15 housed in the cassette 10 is exposed to the radiation, and a radiation image of the object 21 is thereby stored on the stimulable phosphor layer 15a of the stimulable phosphor sheet 15.

After the radiation image has been stored on the stimulable phosphor sheet 15, the radiation image is read out therefrom by using a radiation image read-out system shown in FIG. 4. Specifically, the cover member 13 (not shown in FIG. 4) of the cassette 10 housing the stimulable phosphor sheet 15 is opened, and the cassette 10 is loaded into a cassette loading section 31 of a cassette feeder 30. Thereafter, the stimulable phosphor sheet 15 accommodated in the box member 11 of the cassette 10 is sucked by suction cups 32a, 32a, 32a of a suction arm 32 and taken out of the cassette 10. The suction arm 32 moves in order to introduce the leading end of the stimulable phosphor sheet 15 (i.e. the lower end thereof in FIG. 4) to the position between a pair of endless belts 33, 33, and thereafter air suction of the suction arm 32 is ceased. The stimulable phosphor sheet 15 is conveyed by the endless belts 33, 33 to a pair of nip rollers 34, 34 and is then discharged from an outlet 35. A sheet inlet 41 of a radiation image readout apparatus 40 is located at the position facing the outlet 35. The stimulable phosphor sheet 15, which has been discharged from the outlet 35, is introduced through the sheet inlet 41 into the radiation image read-out apparatus 40 and placed on a horizontal conveyor belt 42, which is located in the radiation image read-out apparatus 40. Above the horizontal conveyor belt 42, there is located an image read-out system 43 for scanning the stimulable phosphor sheet 15 with stimulating rays, such as a laser beam, which cause the stimulable phosphor sheet 15 to emit light in proportion to the amount of energy stored thereon during its exposure to the radiation, and photoelectrically detecting the emitted light. While the stimulable phosphor sheet 15 is being conveyed by the horizontal conveyor belt 42, the radiation image stored on the stimulable phosphor sheet 15 is read out by the image read-out system 43. After the radiation image has been read out from the stimulable phosphor sheet 15, the stimulable phosphor sheet 15 is discharged from an outlet 44 of the radiation image read-out apparatus 40. Thereafter, any energy remaining on the stimulable phosphor sheet 15 is released (erased), and the erased reusable stimulable phosphor sheet 15 is again housed in a cassette and reused during an operation for recording a radiation image.

Figure 5:
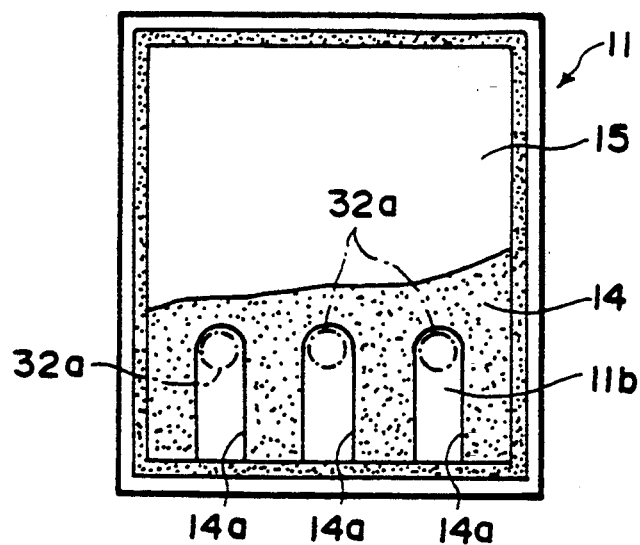
FIG. 5 is a partially cutaway plan view showing a different embodiment of the cassette in accordance with the present invention.

As illustrated in FIG. 2, the single cutaway portion 14a may be located in the vicinity of the positions facing the suction cups 32a, 32a, 32a. Alternatively, as illustrated in FIG. 5, the nonwoven fabric 14 may be provided with a plurality of (three, in this case) cutaway portions 14a, 14a, 14a at positions corresponding to the suction cups 32a, 32a, 32a of the suction arm 32.

In the embodiment described above, the suction cups 32a, 32a, 32a are used in order to take the stimulable phosphor sheet 15 out of the cassette 10. An embodiment, wherein a roller pushes the stimulable phosphor sheet 15 and rotates in order to take it out of the cassette 10, will be described hereinbelow with reference to FIG. 6.

With reference to 6, a cassette 10 is provided a thin bag-like box member 11 having an opening 11c, through which the stimulable phosphor sheet 15 is to be fed into and out of the box member 11. The cassette 10 is also provided with a cover member 13 which is mounted on the box member 11 in order to open and close the opening 11c. By way of example, the box member 11 and the cover member 13 are constituted of a metal having good permeability to radiation or a synthetic resin. The cover member 13 is mounted on the box member 11 such that the cover member 13 can swing around a swing axis A, which is normal to the plane of the sheet of FIG. 6. The cover member 13 opens and closes the opening 11c by swinging around the swing axis A. Such that the cover member 13 can thus swing, for example, a known hinge mechanism may be employed. Alternatively, the box member 11 and the cover member 13 may be integrally molded by using a synthetic resin, and the wall thickness of the portion corresponding to the swing axis A may be reduced such that the cover member 13 can be bent along the swing axis A with respect to the box member 11.

Figure 6:
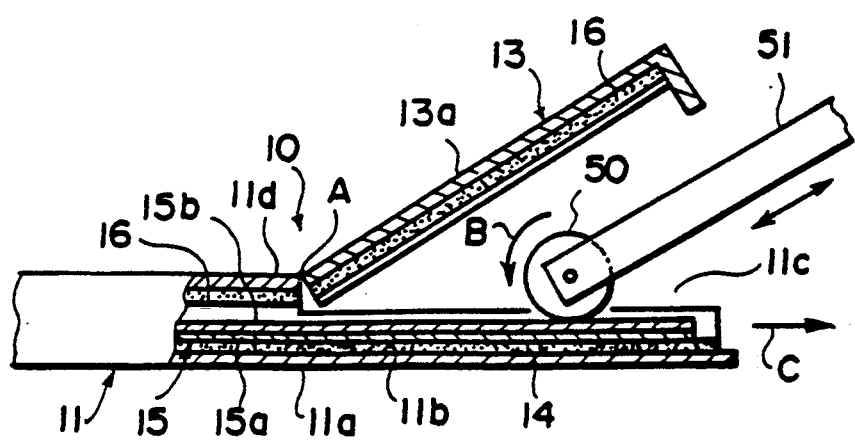
FIG. 6 is a partially cutaway side view showing a different embodiment of the cassette in accordance with the present invention.

In the cassette 10 of FIG. 6, the nonwoven fabric 14 is adhered to the inner surface of the flat plate-like portion 11a of the box member 11, which portion stands facing the stimulable phosphor layer 15a serving as the image recording layer of the stimulable phosphor sheet 15 housed in the cassette 10. Also, the sponge-like elastic layer 16 is adhered to inner surfaces of a flat plate-like portion 11d of the box member 11 and the flat plate-like portion 13a of the cover member 13, which portions stand facing the substrate 15b of the stimulable phosphor sheet 15.

When the stimulable phosphor sheet 15 is to be taken out of the cassette 10, the cassette 10 is positioned at the cassette loading section 31 of the cassette feeder 30, and the cover member 13 is opened as shown in FIG. 6 by an appropriate cover opening means (not shown). An arm 51 having a roller 50 associated with a roller drive means (not shown), such as a small motor, is moved towards the stimulable phosphor sheet 15. The roller 50 thus pushes the stimulable phosphor sheet 15 with a predetermined pressure, and rotated in the direction indicated by the arrow B. In this manner, the stimulable phosphor sheet 15 is moved in the direction indicated by the arrow and is taken out of the cassette 10.

The nonwoven fabric 14 is made by a thermal bond process or a spunlace process. By way of example, Stratec (trade name) supplied by Idemitsu Petrochemical Co., Ltd., and Tyvek (trade name) and Sontara, which are supplied by E. I. Du Pont de Nemours & Co. Inc., and the like, can be used satisfactorily as the nonwoven fabric 14. Stratec and Tyvek are examples of the thermal bond type nonwoven fabric. This kind of nonwoven fabric is made by thermal fusion of laminated web-like fibers. In the spunlace type nonwoven fabric (e.g., Sontara), the fibers are bonded together by water jet or the like. For example, the coefficient of friction of Toraypef (trade name), which is supplied by Toray Industries, Inc. and which is an example of a conventional foamed material, with respect to the stimulable phosphor layer 15a of the stimulable phosphor sheet 15 is 0.9. On the other hand, the coefficient of friction of Stratec with respect to the stimulable phosphor layer 15a of the stimulable phosphor sheet 15 is as low as 0.4. With such a nonwoven fabric, smooth conveyance of the stimulable phosphor sheet 15 can be achieved. Moreover, felt is made by a mechanical bonding method (needle punch, etc.) and is therefore distinguishable from the above-noted nonwoven fabric.

Figure 7:
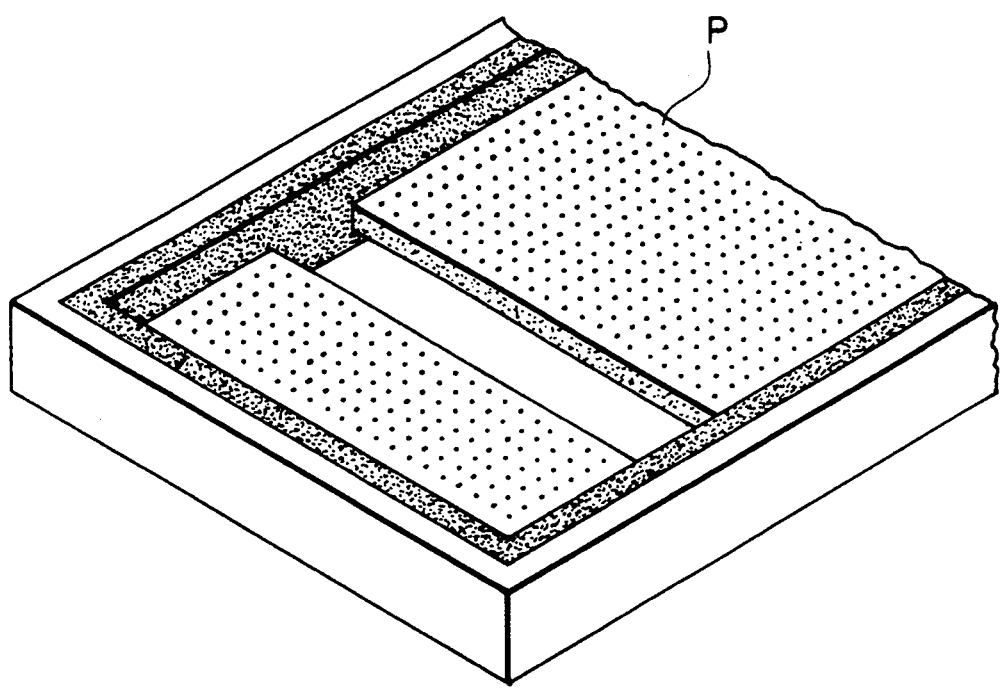
FIG. 7 is a fragmentary perspective view showing an embossed nonwoven fabric.

If nothing is adhered to the flat plate-like portion 11a of the box member 11, when the stimulable phosphor sheet 15 is fed into and out of the cassette 10, the stimulable phosphor layer 15a of the stimulable phosphor sheet 15 will rub against the flat plate-like portion 11a. However, with the aforesaid embodiments of the cassette 10 having the structure described above, wherein the nonwoven fabric 14 is adhered to the inner surface 11b of the flat plate-like portion 11a, the stimulable phosphor layer 15a rubs against the soft nonwoven fabric 14. Therefore, the stimulable phosphor layer 15a is not scratched due to the rubbing. Also, even if the nonwoven fabric 14 is used for a long period of time, it will not crumble. Accordingly, the cassette 10 in accordance with the present invention is free of the problems in that the cushioning material crumbles and constitutes dust, which problems occur when the conventional foamed material is used. Additionally, the nonwoven fabric 14 is porous. Therefore, even if dust somehow enters the cassette 10, dust will enter the pores of the nonwoven fabric 14, and there is no risk that the stimulable phosphor layer 15a of the stimulable phosphor sheet 15 is scratched by such dust. Markedly large such effects can be obtained particularly when the nonwoven fabric 14 is an embossed nonwoven fabric, in which the surface (the surface coming into contact with the stimulable phosphor layer 15a) has been subjected to an embossing process resulting in a number of fine pores P (see FIG. 7).

Further, in general, nonwoven fabrics have a smaller frictional resistance than foamed materials and do not show fluctuations in the frictional resistance, which are encountered with the foamed materials. Therefore, with the aforesaid embodiments of the cassette in accordance with the present invention, a small frictional resistance can always be obtained. Accordingly, when the stimulable phosphor sheet 15 is caused to slip on the cushioning material and is thus fed into and out of the cassette 10, the resistance to slip can be kept small, and the stimulable phosphor sheet 15 can be smoothly fed into and out of the cassette 10. The effects in that the stimulable phosphor sheet 15 can be smoothly fed into and out of the cassette 10 due to a small resistance to slip are significant in cases where the stimulable phosphor sheet 15 slightly slips on the nonwoven fabric 14 when the sheet 15 is taken out by the suction cups 32a, 32a, 32a. Such effects are particularly significant in cases where, for example, the stimulable phosphor sheet 15 is pushed against the nonwoven fabric 14 by the roller 50 and is thereby caused to slip on the nonwoven fabric 14 when the sheet 15 is taken out of the cassette 10.

Furthermore, the nonwoven fabric 14 is provided with the cutaway portion 14a, and the stimulable phosphor sheet 15 does not come into contact with the nonwoven fabric 14 at the position corresponding to the cutaway portion 14a. At the cutaway portion 14a, air intervenes between the stimulable phosphor sheet 15 and the flat plate-like portion 11a of the box member 11. Therefore, when the stimulable phosphor sheet 15 is taken out of the cassette 10, the problems can be prevented from occurring in that the sheet 15 cannot easily be taken out due to close contact between the entire surface of the sheet 15 and the entire surface of the nonwoven fabric 14 adhered to the flat plate-like portion 11a of the box member 11. If the stimulable phosphor sheet 15 is floated even slightly from the flat plate-like portion 11a of the box member 11, air will enter the space formed at the floated portion, and therefore the sheet 15 can be separated easily from the nonwoven fabric 14 when the sheet 15 is taken out of the cassette 10. Therefore, in cases where the suction arm 32 is used to take the stimulable phosphor sheet 15 out of the cassette 10, it is desirable that the portion of the sheet 15 sucked by the suction arm 32 can easily separate from the nonwoven fabric 14. For such purposes, as illustrated in FIG. 2, the cutaway portion 14a of the nonwoven fabric 14 may be located at a position facing the suction cups 32a, 32a, 32a of the suction arm 32.

The nonwoven fabric 14 is porous, and pores in the nonwoven fabric 14 communicate with the exterior such that air can freely enter into and exit the pores. Therefore, in cases where the nonwoven fabric 14 is used as the cushioning material, the cutaway portion 14a need not necessarily be provided, and a nonwoven fabric having no such cutaway portion can ordinarily be used. (In cases where the conventional foamed material is used, it is necessary for such a cutaway portion 14a to be provided.)

Table 1 shows the comparison of characteristics of a nonwoven fabric (stratec), a foamed material, a resin plate material, and felt serving as the cushioning material to be adhered to the inner surface of the cassette.

TABLE 1

| Item | Nonwoven fabric (Stratec) t = 0.3–0.5 mm | Foamed material (Toraypef) | Resin plate material (Leather Emboss No. 6 Black) | Felt |
|---|---|---|---|---|
| Cushioning properties | o | o | x | o |
| Anti-Scratching on phosphor layer | o | o | o | Δ |
| Porosity (entry of dust into pores) | o | Δ | x | o |
| Anti-crumbling of material | o | x | o | o |
| Anti-fraying of material | o | o | o | x |
| Anti-scraping of material | Δ (Depending on the pressure) | Δ (Depending on the pressure) | o | Δ |
| Low coefficient of friction | o | Δ | o | Δ |
| Uniformity of coefficient of friction | o | x | o | Δ |
| Imperceptibility on image (X-ray transmittance) | o | o | o | x |
| Contact properties with phosphor layer | o | o | o | Δ |

In Table 1, the "o" mark indicates that the cushioning material can be used practically. The "Δ" mark indicates that the cushioning material can be used practically if certain conditions are satisfied. The "X" mark indicates that the cushioning material cannot be used practically. Also, the pressure in the expression "depending on the pressure" for the "anti-scraping of material" item refers to the pushing pressure of the roller used to take the stimulable phosphor sheet 15 out of the cassette 10. As the resin plate material, Leather Emboss No. 6 Black supplied by Sanvic Co., Ltd. was used.

In the embodiments of FIGS. 1 and 6, the sponge-like elastic layer 16 is adhered to the inner surface of the flat plate-like portion of the cassette, which portion stands facing the substrate 15b of the stimulable phosphor sheet 15. When necessary, the sponge-like elastic layer 16 may be replaced by a nonwoven fabric.

In the aforesaid embodiments, the stimulable phosphor sheet is housed in the cassette. The same effects can be obtained with the similar cassette structure also when X-ray film is housed in the cassette.

The aforesaid nonwoven fabric is useful as the cushioning material to be adhered to the inner surface of the cassette. The nonwoven fabric is also useful as a sliding material, which is adhered to conveyance system members, such as guide plates, in the conveyance system for the stimulable phosphor sheet shown in FIG. 4 in order to achieve smooth slipping of the stimulable phosphor sheet.

What is claimed is:

1. A cassette for housing therein a sheet-shaped radiation image recording medium such that the sheet-shaped radiation image recording medium is capable of being taken out therefrom, wherein the improvement comprises the provision of one of a thermal-bond and a spunlace type nonwoven fabric, which is adhered to an inner surface of a flat plate-like portion of the cassette, said flat plate-like portion facing an image recording layer of the sheet-shaped radiation image recording medium, said nonwoven fabric directly contacting said image recording layer, thereby preventing said sheet-shaped radiation image recording medium from being scratched.

2. A cassette as defined in claim 1 wherein said nonwoven fabric is an embossed nonwoven fabric.

3. A cassette as defined in claim 1 wherein said nonwoven fabric is provided with a cutaway portion.

4. A cassette as defined in claim 1 wherein the sheet-shaped radiation image recording medium is a stimulable phosphor sheet.

5. A cassette as defined in claim 1 wherein the sheet-shaped radiation image recording medium is photographic film.

6. A cassette as defined in claim 1, wherein said nonwoven fabric has a coefficient of friction with respect to said image recording layer of 0.4.

7. A cassette as defined in claim 1, wherein said nonwoven fabric is a thermal bond type nonwoven fabric selected from the group consisting of Stratec and Tyvek.

8. A cassette as defined in claim 1, wherein said nonwoven fabric is Sontara.

* * * * *